(12) United States Patent
Pacella et al.

(10) Patent No.: US 6,328,373 B1
(45) Date of Patent: Dec. 11, 2001

(54) ENCAPSULATED VEHICLE DOOR FRAME

(75) Inventors: John P. Pacella, Rochester Hills; Joseph E. Mrozowski, Clarkston; Earl E. Kansier, White Lake, all of MI (US)

(73) Assignee: The Budd Company, Troy, MI (US)

( * ) Notice: Subject to any disclaimer, the term of this patent is extended or adjusted under 35 U.S.C. 154(b) by 0 days.

(21) Appl. No.: 09/664,156

(22) Filed: Sep. 18, 2000

(51) Int. Cl.$^7$ ...................................................... B62D 25/04
(52) U.S. Cl. .................... 296/146.5; 296/146.9; 49/502
(58) Field of Search ........................... 296/146.5, 146.15, 296/146.16, 146.9, 206; 49/502, 377, 166

(56) References Cited

U.S. PATENT DOCUMENTS

| | | | |
|---|---|---|---|
| 4,648,208 | * | 3/1987 | Baldamus et al. . |
| 4,956,943 | * | 9/1990 | Yamada et al. . |
| 5,139,305 | * | 8/1992 | Kranz et al. . |
| 6,039,384 | * | 3/2000 | Schulte et al. . |

* cited by examiner

Primary Examiner—Stephen T. Gordon
Assistant Examiner—Scott Carpenter
(74) Attorney, Agent, or Firm—Harness, Dickey & Pierce, P.L.C.

(57) ABSTRACT

A closure member for a closing an aperture in a vehicle body. The closure member includes a frame structure and a seal member. The frame structure has an upper frame member that defines a window aperture. The seal member is formed onto at least a portion of the frame member and includes a body seal portion and a window seal portion. The body seal portion forms a seal between the vehicle body and at least a portion of the upper frame member. The window seal portion forms a seal between the at least a portion of the upper frame member and a window member that is movable relative to the frame structure. A method for forming a closure member is also provided.

13 Claims, 5 Drawing Sheets

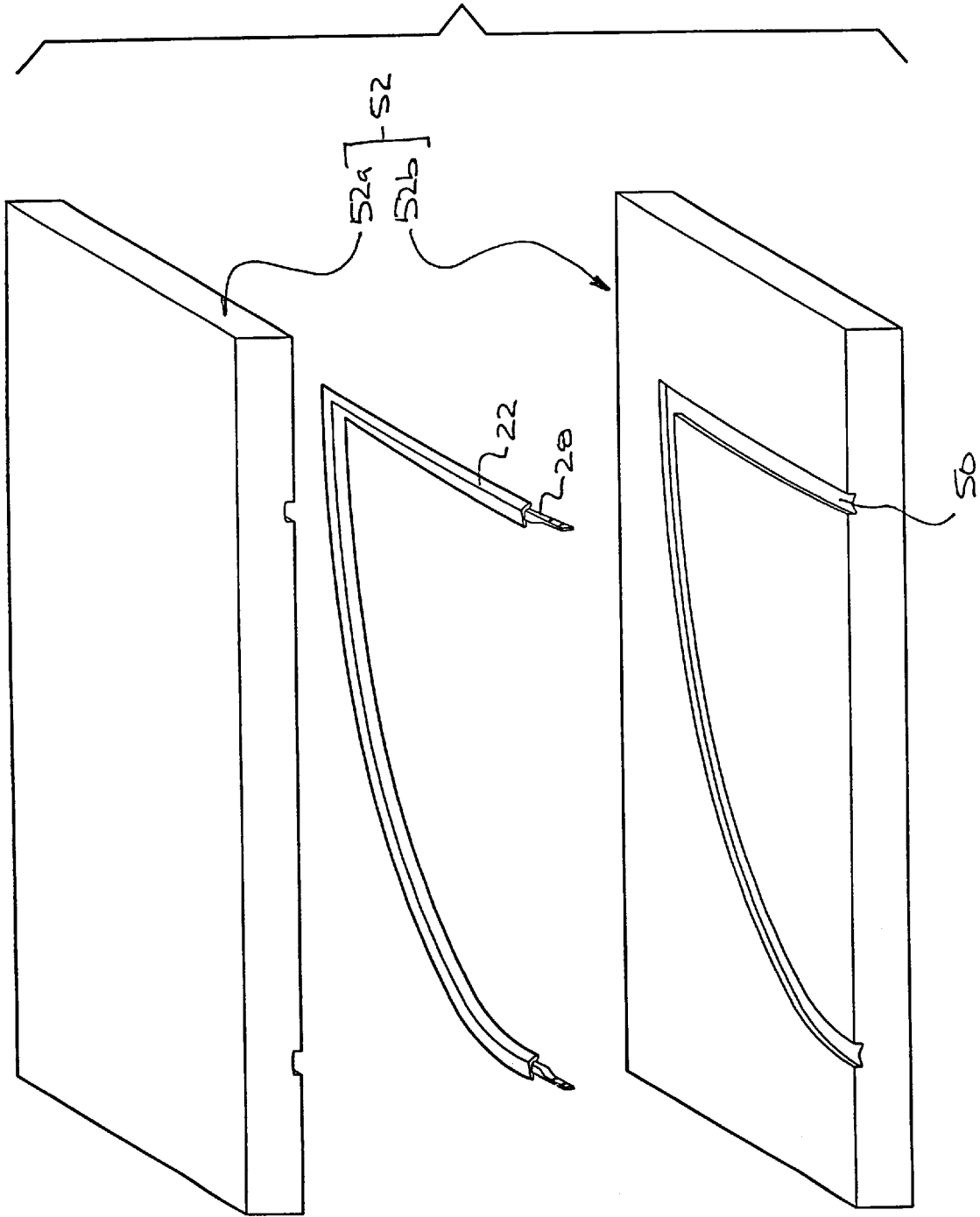

ENCAPSULATED VEHICLE DOOR FRAME

BACKGROUND OF THE INVENTION

1. Technical Field

The present invention relates generally to closure members for automotive vehicles and more particularly to a closure member having a frame structure with a molded-on multi-function seal member.

2. Background Art

Modern consumers are demanding vehicles having higher quality and performance and lower costs. One area which has the potential to cause consumers to forgo the purchase of a particular vehicle concerns the quality and performance of the seals on its closure members (e.g., side doors, tailgate). High quality seals inhibit the transmission of wind and road noise, dust and moisture to the interior of the vehicle body, providing the passengers with a quieter and more comfortable environment.

Complex, high performance seals are routinely employed for sealing the closure member to the vehicle body and for sealing a window member to the frame of the closure member. While these configurations have generally been successful at providing a high quality seal, they are typically costly to fabricate and install. Furthermore, defects in the installation of these seals tend to negate a substantial degree of their benefits.

SUMMARY OF THE INVENTION

It is one object of the present invention to provide a closure member having a high quality seal member which is coupled thereto in an efficient and relatively error-free manner.

It is another object of the present invention to provide a closure member having a seal member having both a body seal portion and a window seal portion.

It is yet another object of the present invention to provide a method for forming a seal member onto the frame structure of a closure member.

In one preferred form, the present invention provides a closure member for a closing an aperture in a vehicle body. The closure member includes a frame structure and a seal member. The frame structure has an upper frame member that defines a window aperture. The seal member is formed onto at least a portion of the frame member and includes a body seal portion and a window seal portion. The body seal portion forms a seal between the vehicle body and at least a portion of the upper frame member. The window seal portion forms a seal between the at least a portion of the upper frame member and a window member that is movable relative to the frame structure. A method for forming a closure member is also provided.

BRIEF DESCRIPTION OF THE DRAWINGS

Additional advantages and features of the present invention will become apparent from the subsequent description and the appended claims, taken in conjunction with the accompanying drawings, wherein:

FIG. 4 is a view of the tooling for forming the seal member onto the upper frame member;

DETAILED DESCRIPTION OF THE PREFERRED EMBODIMENT

Figure 1:
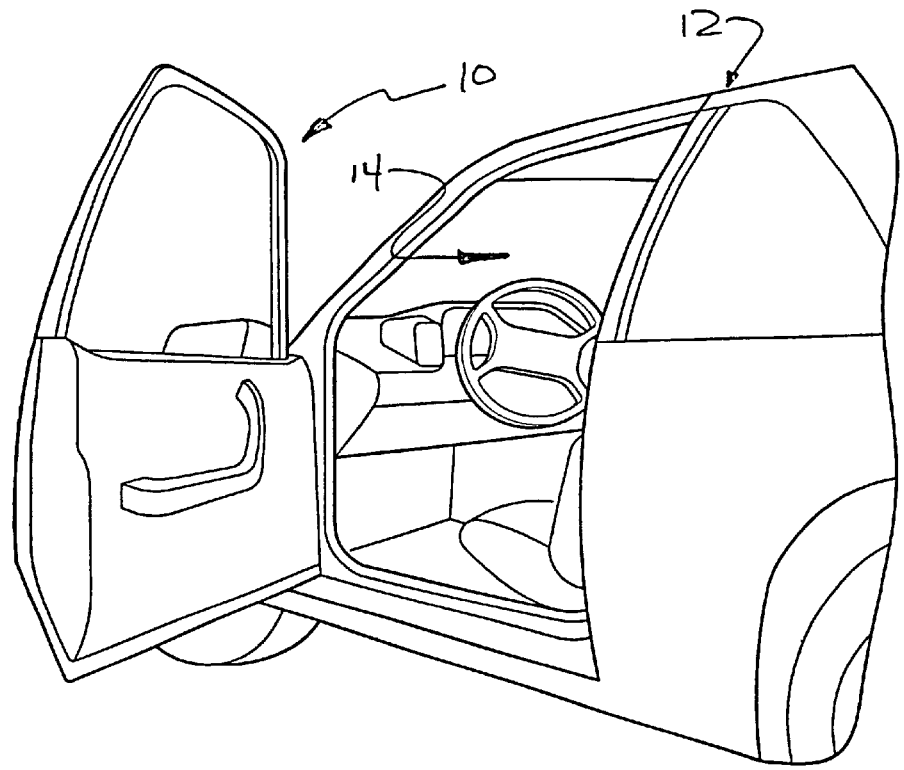
FIG. 1 is a perspective view of a closure member constructed in accordance with the teachings of the present invention in operative association with a vehicle body.

With reference to FIG. 1 of the drawings, a closure member constructed in accordance with the teachings of the present invention is generally indicated by reference numeral 10. Closure member 10 is illustrated to be operatively associated with a vehicle body 12 wherein a pair of hinges (not specifically shown) pivotably coupled closure member 10 to vehicle body 12. The hinges permit closure member 10 to be positioned in a closed position wherein closure member 10 substantially closes an aperture 14 formed in vehicle body 12. The hinges also permit closure member 10 to be positioned in an open position wherein closure member 10 substantially clears aperture 14 to permit passengers to gain ingress to or egress from vehicle body 12.

Figure 2:
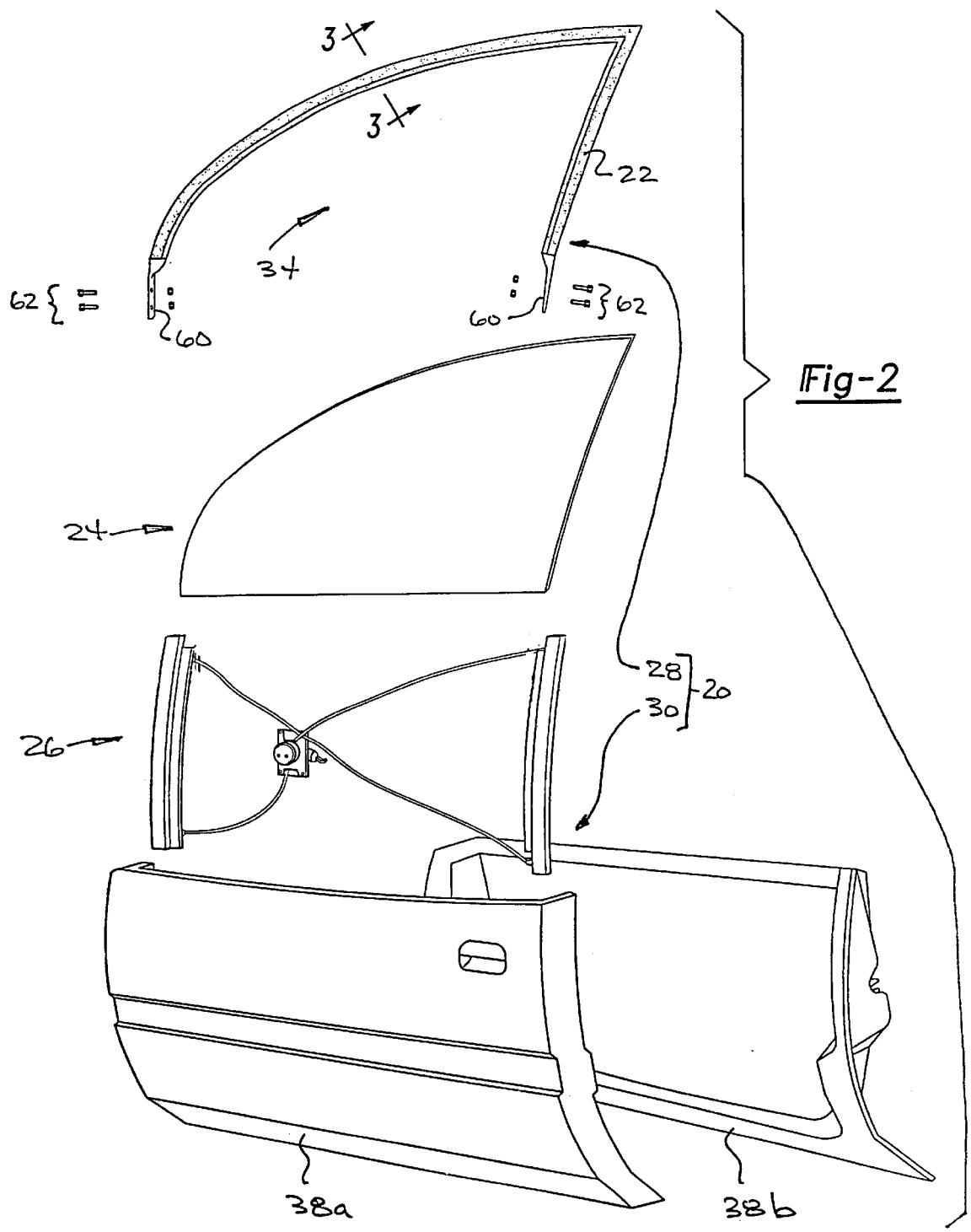
FIG. 2 is an exploded perspective view of the closure member of FIG. 1.

In FIG. 2, closure member 10 is illustrated to include a frame structure 20, a seal member 22, a window member 24 and a window regulator mechanism 26. In the particular embodiment illustrated, frame structure 20 is shown to include an upper frame member 28 and a lower frame member 30. However, those skilled in the art will appreciate that the teachings of the present invention have applicability to closure members of other types and as such, the scope of the present invention will not be limited to closure members having the particular configuration illustrated.

The construction of frame structure 20 is beyond the scope of this disclosure and need not be discussed in detail. Briefly, upper frame member 28 is preferably formed from a tubing, extrusion or rolled sheet metal which is subsequently bent in a generally "U" shape to define a window aperture 34. Lower frame member is formed from a pair of skin structures 38a, 38b which are fixedly coupled to one another through a conventional joining process, such as welding.

Figure 3:
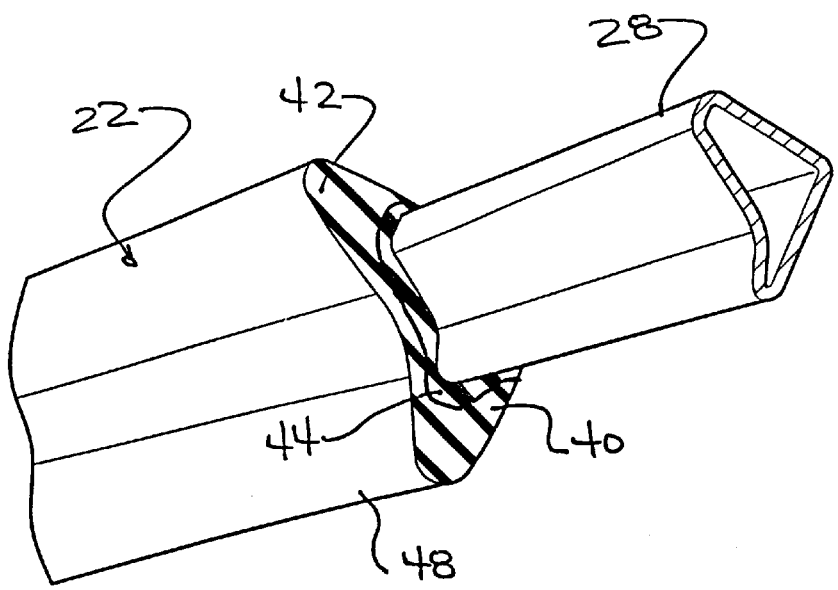
FIG. 3 is a cross-sectional view taken along the line 3—3 of FIG. 2.

With additional reference to FIG. 3, seal member 22 is shown to be formed onto a portion of upper frame member 28. Seal member 22 is formed from a resilient elastomer and includes a body seal portion 40 and a window seal portion 42. Preferably, seal member 22 includes a core portion 44 having a first, relatively soft durometer and a exterior portion 48 having a second, relatively harder durometer. In the particular embodiment illustrated, seal member 22 is illustrated to encapsulate a portion of upper frame member 28. However, those skilled in the art will understand that the exact configuration of seal member 22 may be varied depending on numerous design criteria and as such, the scope of the present invention will extend to a seal member 22 of any configuration which is formed onto a frame member for a closure member in accordance with the disclosure set forth herein.

In FIG. 4, the formation of seal member 22 onto upper frame member 28 is illustrated. Upper frame member 28 is initially positioned in a mold cavity 50 of a mold, such as injection mold 52. The mold halves 52a, 52b are mated to one another and mold cavity 50 is filled with the material which forms seal member 22. Upper frame member 28 remains in mold cavity 50 a sufficient amount of time to permit seal member 22 to cure. Seal member 22 preferably bonds to upper frame member 28 as it forms and cures. As injection mold 52 repeatably locates upper frame member 28 and consistently forms seal member 22, relatively few defects are associated with the formation of seal member 22 onto upper frame member 28.

Referring back to FIG. 2, closure member 10 is then subassembled once seal member 22 has been formed on upper frame member 28. The proximal ends 60 of upper frame member 28 are fastened to lower frame member 30 via welding or threaded fasteners 62 and window regulator mechanism 26 and window member 24 are coupled to frame structure 20. Window regulator mechanism 26 is operable for moving window member 24 in window aperture 34 between a raised position wherein window member 24 substantially closes window aperture 34 and a lowered position wherein window member 24 clears at least a substantial portion of window aperture 34. Window regulator mechanism 26 is conventional in both its operation and construction and need not be discussed in detail.

Figure 5:
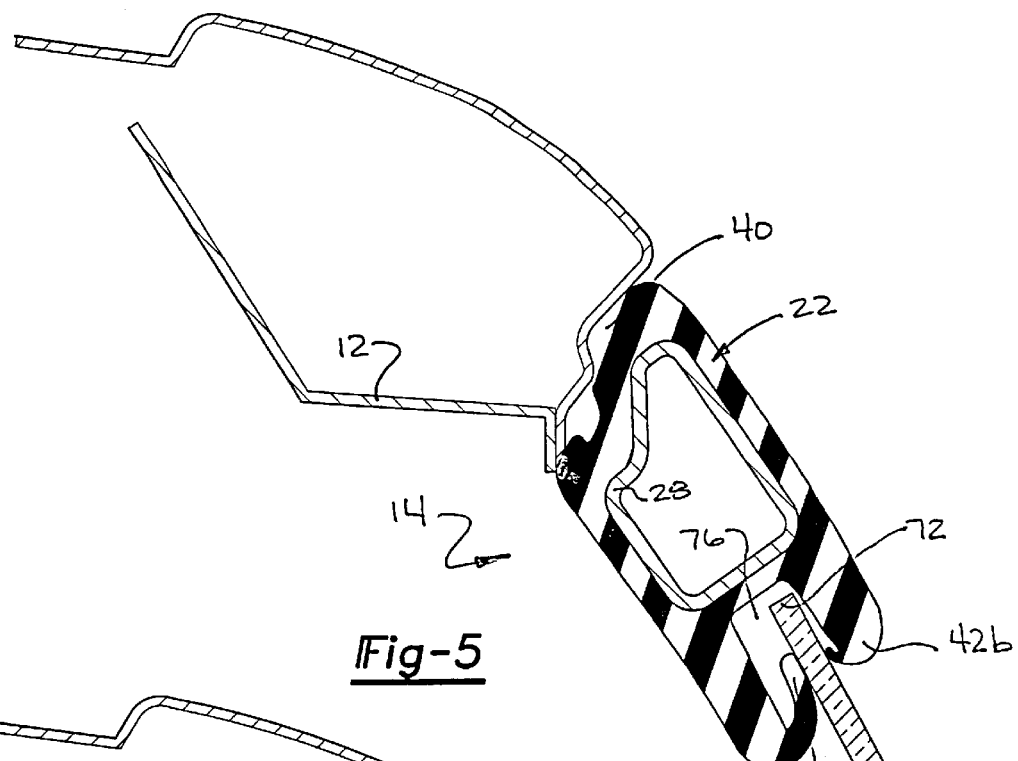
FIG. 5 is a cross-sectional view taken along the line 5—5 of FIG. 1.

As shown in FIG. 5, the interior and exterior surfaces 70a and 70b, respectively, of window member 24 sealingly engages the window seal portions 42a and 42b, respectively, of seal member 22 when window member 24 is positioned in the raised position. The body seal portion 40 of seal member 22 is shown to sealingly engage vehicle body 12 in an area proximate aperture 14 when closure member 10 is positioned in the closed position to guard against the infiltration of air and water between vehicle body 12 and upper frame member 28.

Figure 6:
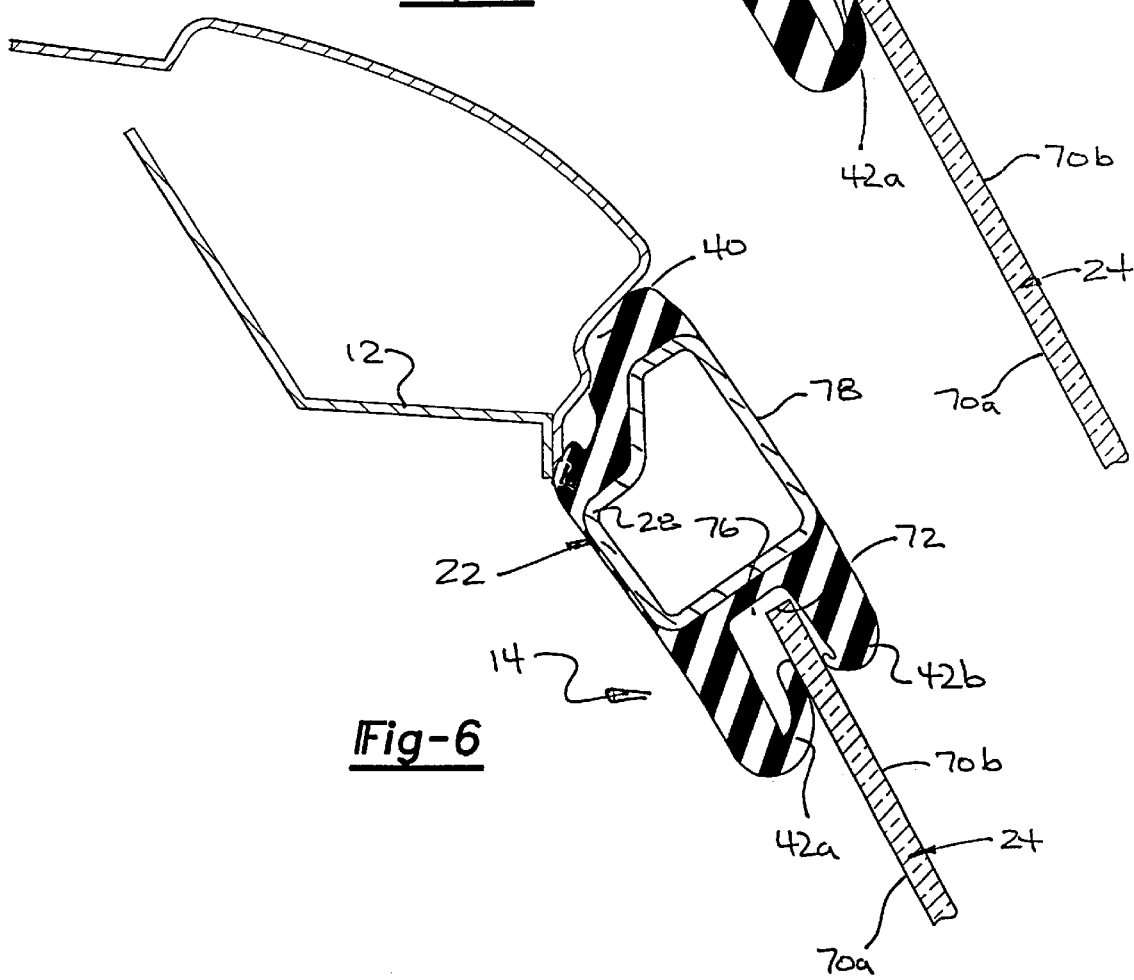
FIG. 6 is a cross-sectional view similar to FIG. 5 but showing an alternate configuration of the seal member.

Positioning window member 24 into the raised position permits the edge 72 of window member 24 to engage a window edge aperture 76 defined by the window seal portions 42a and 42b of seal member 22. In the particular embodiment illustrated, seal member 22 is employed to completely encapsulate a portion of upper frame member 28. Those skilled in the art will understand, however, that seal member 22 may be sized to expose portions of the upper frame member 28, such as the exterior surface 78 of upper frame member 28 as illustrated in FIG. 6.

Figure 7:
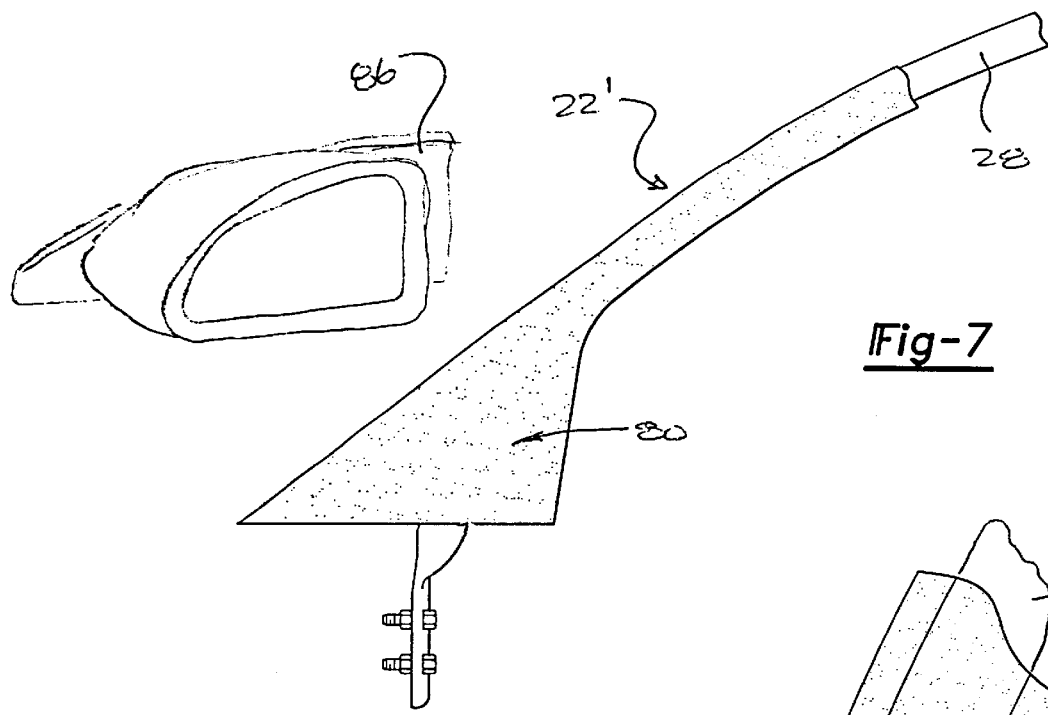
FIG. 7 is an exploded perspective view illustrating another alternate configuration of the seal member.

While closure member 10 has been described thus far as including a seal member 22 for sealing aperture 14 and window aperture 34, those skilled in the art will appreciate that the invention, in its broader aspects, may be constructed somewhat differently. For example, the seal member may be formed to include a mirror gasket as shown in FIG. 7. In this arrangement, seal member 22' is shown to be constructed similarly to seal member 22, except that seal member 22' is shown to include a mirror gasket portion 80. Mirror gasket portion 80 extends over a portion of lower frame member 30 and is configured to form a seal between lower frame member 30 and a mirror housing 86. Construction of seal member 22' in this manner is advantageous in that it eliminates the need for a separate mirror housing gasket.

Figure 8:
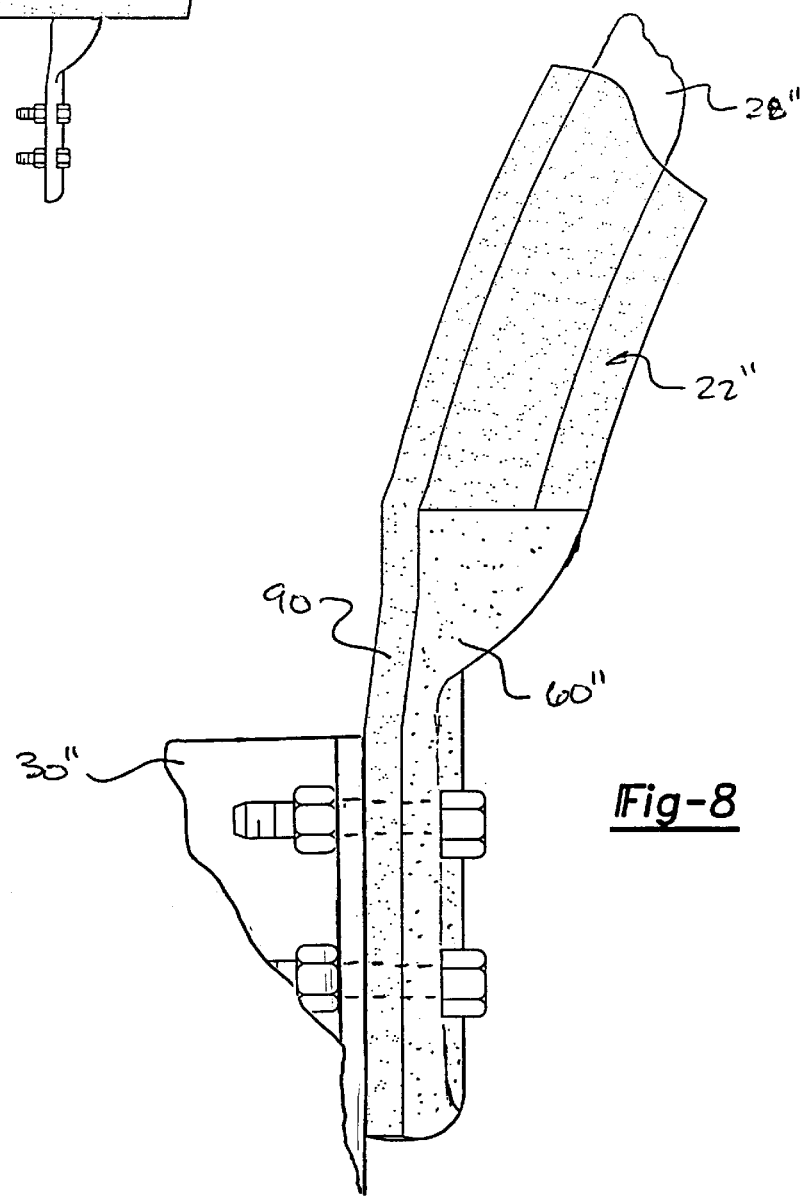
FIG. 8 is an exploded perspective view similar to FIG. 2 but illustrating another configuration of the seal member.

Another arrangement is illustrated in FIG. 8 wherein upper frame member 28" and lower frame member 30" are formed from dissimilar materials, such as aluminum and steel, respectively. Mounting the proximal ends 60" of upper frame member 28" to lower frame member 30" would permit a galvanic reaction to occur wherein electrochemical activity would cause corrosion to initiate at the interface between upper and lower frame members 28" and 30". Seal member 22" is illustrated to include an isolator portion 90 which encapsulates the proximal ends 60" of upper frame member 28", thereby creating a barrier which electrically isolates upper and lower frame members 28" and 30".

Accordingly, while the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A closure member for closing an aperture in a vehicle body, the closure member comprising:

a frame structure having an upper frame member that defines a window aperture; and a seal member encapsulating at least a portion of the frame member, the seal member having a body seal portion adapted to form a seal between the vehicle body and at least a portion of the upper frame member and a window seal portion adapted to form a seal between the at least a portion of the upper frame member and a window member that is movable relative to the frame structure.

2. The closure member of claim 1, wherein the seal member is formed onto the at least a portion of the upper frame member before the upper frame member is joined to a lower frame member.

3. The closure member of claim 2, wherein the upper and lower frame members are fabricated from different materials and the seal member is disposed between the upper and lower frame members to inhibit a galvanic reaction therebetween.

4. The closure member of claim 1, wherein the seal member further comprises a mirror gasket portion adapted to form a seal between the frame structure and a mirror housing.

5. The closure member of claim 1, wherein the seal member includes a first portion having a first durometer and a second portion having a second durometer.

6. The closure member of claim 1, wherein the window seal portion includes a structure that defines a window edge aperture, the window edge aperture adapted to receive an edge of the window member.

7. The closure member of claim 1, wherein the seal member is formed in an injection mold.

8. A vehicle comprising:

a vehicle body defining an aperture; and a closure member hingedly coupled to the vehicle body and positionable between an open position and a closed position wherein the closure member substantially closes the aperture in the vehicle body, the closure member including a frame structure, a window member and a seal member, the frame structure having an upper frame member that defines a window aperture, the window member mounted to the frame structure and movable within the window aperture between a lowered position and a raised position, the seal member encapsulating at least a portion of the frame member, the seal member having a body seal portion that forms a seal between the vehicle body and at least a portion of the upper frame member when the closure member is positioned in the closed position and a window seal portion that forms a seal between the at least a portion of the upper frame member and the window member when the window member is placed in the raised position.

9. The vehicle of claim 8, wherein the window seal portion includes a structure that defines a window edge aperture that is adapted to receive an edge of the window member.

10. The vehicle of claim 8, wherein the seal member is formed onto the at least a portion of the upper frame member before the upper frame member is joined to a lower frame member.

11. The vehicle of claim 8, wherein the seal member includes a first portion having a first durometer and a second portion having a second durometer.

12. The vehicle of claim 8, wherein the upper and lower frame members are fabricated from different materials and the seal member is disposed between the upper and lower frame members to inhibit a galvanic reaction therebetween.

13. The vehicle of claim 8, wherein the seal member is formed in an injection mold.

\* \* \* \* \*